United States Patent [19]

Clevenger, Jr. et al.

[11] 4,452,032
[45] Jun. 5, 1984

[54] APPARATUS AND METHOD FOR LUBRICATING APRON CHAINS ON ROLL BALING MACHINES

[75] Inventors: James T. Clevenger, Jr., Lancaster; Donald L. Sheesley, New Holland; John S. Richardson, Jr., Terre Hill, all of Pa.

[73] Assignee: Sperry Corporation, New Holland, Pa.

[21] Appl. No.: 413,114

[22] Filed: Aug. 30, 1982

[51] Int. Cl.³ .......................................... A01D 69/12
[52] U.S. Cl. ....................................... 56/12.3; 56/341
[58] Field of Search ............... 56/12.3, DIG. 11, 341; 184/27 R, 32, 37; 417/568

[56] References Cited

U.S. PATENT DOCUMENTS 3,461,990 8/1969 Stripp et al. ............................ 184/37
3,901,007 8/1975 Blanshine et al. ..................... 56/341

FOREIGN PATENT DOCUMENTS 2036887 7/1980 United Kingdom ................. 56/123

*Primary Examiner*—Gene Mancene
*Assistant Examiner*—John G. Weiss
*Attorney, Agent, or Firm*—Darrell F. Marquette; Frank A. Seemar; Larry W. Miller

[57] ABSTRACT

An apron chain lubricating apparatus for roll baling machines is actuated to automatically lubricate the apron chains in response to the rear frame of the machine being raised and lowered such as in discharging a bale from the machine. The apron lubricating apparatus includes a reservoir, containing lubricant, and a pump both preferably mounted on the rear frame of the machine. The pump is operated to deliver lubricant from the reservoir onto the apron chains when the rear frame is raised and lowered.

4 Claims, 3 Drawing Figures

APPARATUS AND METHOD FOR LUBRICATING APRON CHAINS ON ROLL BALING MACHINES

BACKGROUND OF THE INVENTION

A conventional type of apron or conveyor used on roll baling machines is disclosed in U.S. Pat. No. 3,901,007 and consists of a pair of endless link chains connected at spaced intervals by transverse bars or slats. The apron chains must be lubricated to prevent premature wear to them and to insure proper operation of the apron. In the past, the apron chains have been manually lubricated. This method of lubricating is undesirable because it is time consuming and messy. Furthermore, manual lubrication is often done improperly and/or inadequately and is often totally neglected.

SUMMARY OF THE INVENTION

The present invention provides means for automatically lubricating the apron chains on roll baling machines having a base frame and a rear frame connected to the base frame for movement between a lower position and an upper position. The means for automatically lubricating the apron chains is actuated in response to movement of the rear frame between the lower position and the upper position.

In the preferred embodiment of the invention, the means for automatically lubricating the apron chains comprises apparatus including a reservoir containing lubricant, and a pump mounted on the rear frame of a roll baling machine. The pump is operated to deliver lubricant from the reservoir onto the apron chains when the rear frame is moved to the upper position and then to the lower position.

DESCRIPTION OF THE PREFERRED EMBODIMENT

Figure 1:
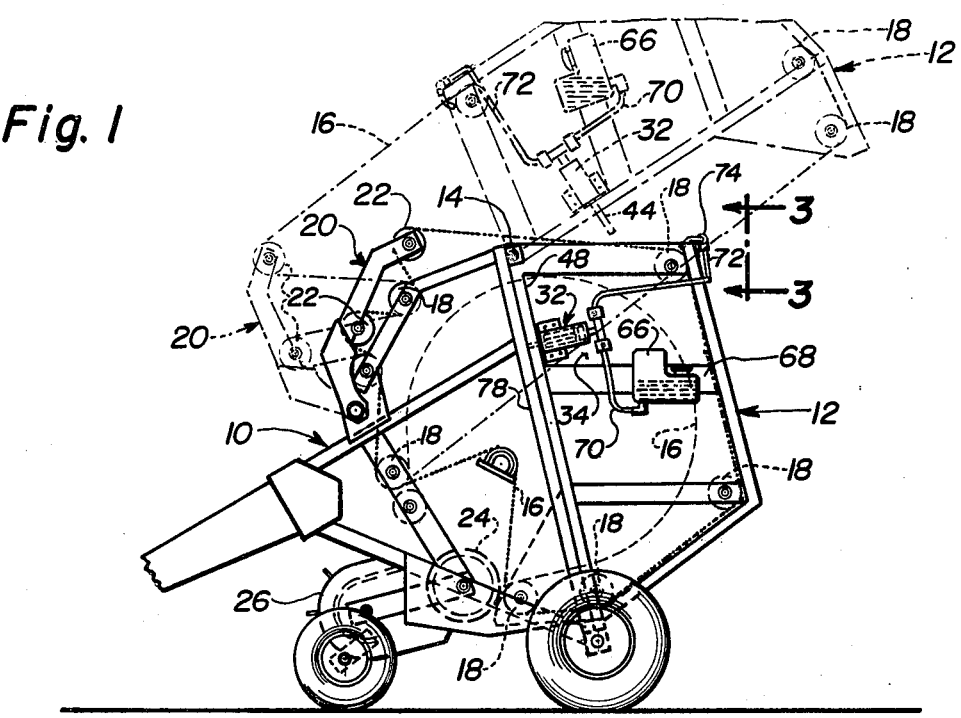
FIG. 1 is a side elevation view of a typical roll baling machine embodying the apron chain lubricating apparatus of the present invention.

Referring to FIG. 1, a typical roll baling machine embodying the preferred embodiment of the present invention includes a base frame 10 and a rear frame 12 pivotally connected to the base frame 10 for movement between a lower position shown in full lines and an upper position shown in phantom lines. A flexible apron 16 is movably supported on guide members 18 mounted in the base frame 10 and in the rear frame 12. An arm assembly 20 is rotatably mounted on the base frame 10 and carries additional guide members 22 for supporting part of the apron 16. The arm assembly 20 rotates as shown to control the expansion and contraction of the apron 16 in the bale forming chamber. A floor roller 24 is rotatably mounted on the base frame 10 and cooperates with the apron 16 in a known manner to form roll bales of crop material. A pickup mechanism 26 is also mounted on the base frame 10 for picking up crop material and delivering it to the bale forming chamber.

Figure 3:
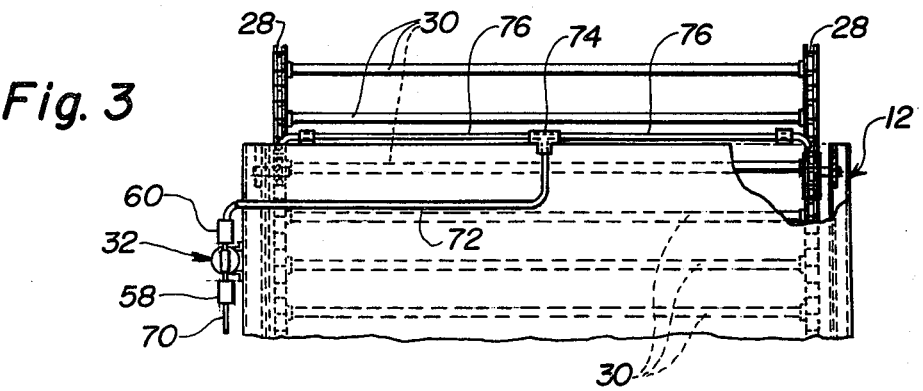
FIG. 3 is a sectional view taken along lines 3—3 of FIG. 1.

The apron 16, as seen in FIG. 3, is of the type formed of a pair of endless link chains 28 connected at spaced intervals by transverse bars or slats 30. This type of apron is disclosed in U.S. Pat. No. 3,901,007 and is designated therein by the numeral "82".

Figure 2:
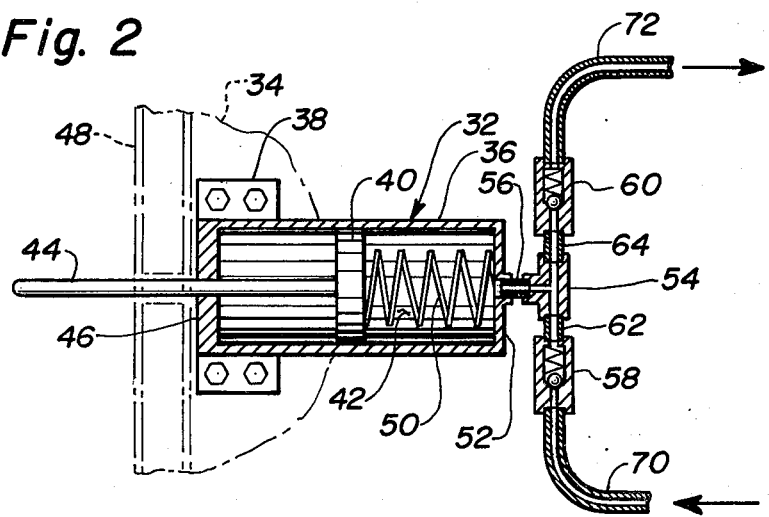
FIG. 2 is an enlarged view primarily of the pump used in the apron chain lubricating apparatus.

According to the present invention, an apparatus for lubricating the apron chains 28 is provided on the roll baling machine of FIG. 1 and includes a pump 32 preferably mounted on a side plate 34 of the rear frame 12. As shown in FIG. 2, the pump 32 consists of a cylinder 36 secured to a mounting bracket 38, a piston 40 slidably and sealingly engaged with the inner wall of the cylinder 36 to define a fluid chamber 42 therein, and a piston rod 44 attached to the piston 40 extending through the end 46 of the cylinder 36 and through a frame member 48 of the rear frame 12. A spring 50 is disposed in the cylinder 36 and is engaged between the piston 40 and the end 52 of the cylinder 36. The spring 50 normally urges the piston 40 toward the end 46 of the cylinder 36. A tee fitting 54 is connected to the cylinder 36 by a conduit 56. Ball type check valves 58 and 60 are connected to the tee fitting 54 by conduits 62 and 64, respectively. A reservoir 66 containing lubricant, such as oil, is preferably mounted on a frame member 68 of the rear frame 12. A conduit 70 is connected between the reservoir 66 and the check valve 58. Another conduit 72 extends from the check valve 60 to a tee fitting 74 mounted on the rear frame 12. Branch conduits 76 extend in opposite directions from the tee fitting 74 to the apron chains 28 as seen in FIG. 3.

The pump 32 is arranged so that when the rear frame 12 is raised to the upper position shown in FIG. 1, such as to discharge a bale from the machine, the spring 50 urges the piston 40 toward the end 46 of the cylinder 36. This creates a suction effect in the cylinder 36 which causes a charge of lubricant to be drawn through the conduit 70 from the reservoir 66 and then past the check valve 58 into the fluid chamber 42 in the cylinder 36. Meanwhile, the check valve 60 prevents lubricant from entering the conduit 72. When the rear frame 12 is subsequently returned to the lower position shown in FIG. 1 such as after discharging a bale from the machine, the piston rod 44 engages the frame member 78 of the base frame 10 thereby moving the piston 40 toward the end 52 of the cylinder 36. This causes the charge of lubricant contained in the fluid chamber 42 in the cylinder 36 to be pumped past the check valve 60, through the conduit 72 and the branch conduits 76, and onto the apron chains 28. The check valve 58 simultaneously prevents the lubricant from returning to the reservoir 66 via the conduits 70. Therefore, it will be understood that the apron chain lubricating apparatus of the present invention is actuated to lubricate the apron chains 28 in response to the rear frame 12 being raised and lowered such as in discharging a bale from the machine. This method of lubricating keeps the apron chains 28 adequately and properly lubricated without wasting lubricant.

Alternatively, the lubricating apparatus of the present invention may be actuated electronically rather than mechanically as in the preferred embodiment already described.

The apparatus of the present invention is not limited to use on roll baling machines with expandable bale chambers, and accordingly, may be used on roll baling machines with fixed bale chamber.

The following claims are intended to cover all modifications and variations of the preferred embodiment of the present invention without departing from the spirit and scope of the invention.

Having thus described the invention, what is claimed is:

1. In a roll baling machine having a base frame, a rear frame connected to said base frame for movement between a lower position and upper position, an apron movably supported on said base frame and said rear frame for forming roll bales of crop material, said apron including flexible chains and transverse members extending between and interconnecting said flexible chains, the improvement of an apparatus for lubricating said flexible chains, said apparatus comprising:
   (a) a reservoir containing lubricant mounted on said rear frame;
   (b) pump means mounted on said rear frame, said pump means defining a fluid chamber therein;
   (c) first conduit means extending between said reservoir and said pump means;
   (d) second conduit means extending between said pump means and said flexible chains;
   (e) said pump means being operated to draw a charge of lubricant from said reservoir through said first conduit means into ssaid fluid chamber in response to movement of said rear frame to said upper position;
   (f) said pump means being operated to pump said charge of lubricant from said fluid chamber through said conduit means onto said flexible chains in response to movement of said rear frame from said upper position to said lower position; and
   (g) said pump means including actuating means for engaging said base frame when said rear frame is moved from said upper position to said lower position in order to actuate said pump means to deliver lubricant through said second conduit means onto said flexible chains.

2. The apparatus according to claim 1, wherein said pump means comprises:
   (a) a cylinder;
   (b) a piston slidably disposed in said cylinder defining said fluid chamber therein;
   (c) a spring disposed in said cylinder for urging said piston in a first direction in said cylinder to draw said charge of lubricant from said reservoir through said first conduit means into said fluid chamber; and
   (d) said actuating means including a piston rod connected to said piston for engaging said base frame for moving said piston in a second direction in said cylinder to pump said charge of lubricant from said fluid chamber through said second conduit means onto said flexible chains.

3. The apparatus according to claims 1 or 2, further comprising:
   (a) a first check valve in said first conduit means permitting said charge of lubricant to flow only from said reservoir into said fluid chamber; and
   (b) a second check valve in said second conduit means permitting said charge of lubricant to flow only from said fluid chamber onto said flexible chains.

4. The apparatus according to claim 1, wherein said actuating means is disengaged from said base frame when said rear frame is moved from said lower position to said upper position.

* * * * *